(12) United States Patent
Berkcan et al.

(10) Patent No.: US 8,601,880 B2
(45) Date of Patent: Dec. 10, 2013

(54) WIRELESS STRAIN SENSORS, DETECTION METHODS, AND SYSTEMS

(75) Inventors: Ertugrul Berkcan, Clifton Park, NY (US); Emad Andarawis Andarawis, Ballston Lake, NY (US)

(73) Assignee: General Electric Company, Niskayuna, NY (US)

( * ) Notice: Subject to any disclaimer, the term of this patent is extended or adjusted under 35 U.S.C. 154(b) by 141 days.

(21) Appl. No.: 13/101,834

(22) Filed: May 5, 2011

(65) Prior Publication Data

US 2011/0208446 A1    Aug. 25, 2011

Related U.S. Application Data

(62) Division of application No. 12/255,355, filed on Oct. 21, 2008, now Pat. No. 7,975,554.

(51) Int. Cl.
*G01L 1/00*         (2006.01)

(52) U.S. Cl.
USPC ............................................. 73/773

(58) Field of Classification Search
USPC .................................... 73/773, 777
See application file for complete search history.

(56) References Cited

U.S. PATENT DOCUMENTS

| 3,290,930 | A | * | 12/1966 | Drinkwater | .............. 73/862.325 |
| 6,543,296 | B1 | | 4/2003 | Bermudez | |
| 7,245,117 | B1 | | 7/2007 | Joy et al. | |
| 7,389,682 | B2 | | 6/2008 | Vaherian | |
| 2002/0147416 | A1 | | 10/2002 | Zogbi et al. | |
| 2007/0210786 | A1 | | 9/2007 | Allen et al. | |
| 2007/0247138 | A1 | | 10/2007 | Miller et al. | |
| 2008/0077016 | A1 | | 3/2008 | Sparks et al. | |
| 2009/0121896 | A1 | * | 5/2009 | Mitchell et al. | .......... 340/870.31 |

FOREIGN PATENT DOCUMENTS

JP        11236801      8/1999

* cited by examiner

*Primary Examiner* — Harshad R Patel
*Assistant Examiner* — Octavia Davis-Hollington
(74) *Attorney, Agent, or Firm* — John P. Darling

(57) ABSTRACT

A strain sensor comprises a transmitting element; a receiving element wirelessly coupled to the transmitting element; and a modulating element located on a rotating component, wherein the modulating element modulates the wireless coupling between the transmitting element and the receiving element, wherein the modulation of the wireless coupling is indicative of strain on the rotating component. A method of detecting strain in a rotating component of a rotary machine comprises wirelessly coupling a transmitting element and a receiving element; modulating the coupling with a modulating element located on the rotating component; and calculating the strain in the rotating component based on the modulation of the coupling.

15 Claims, 10 Drawing Sheets

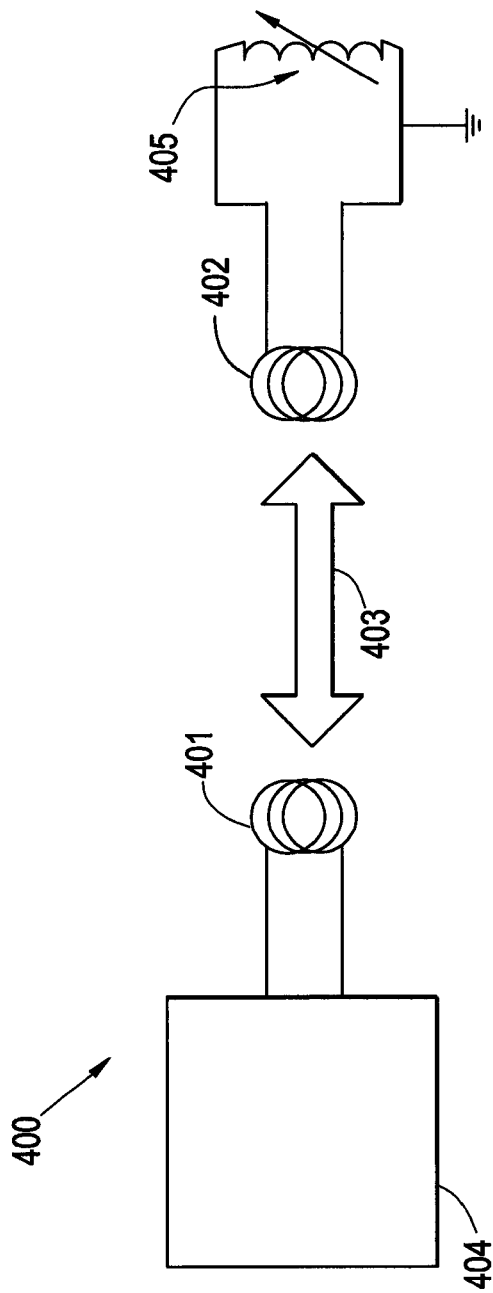

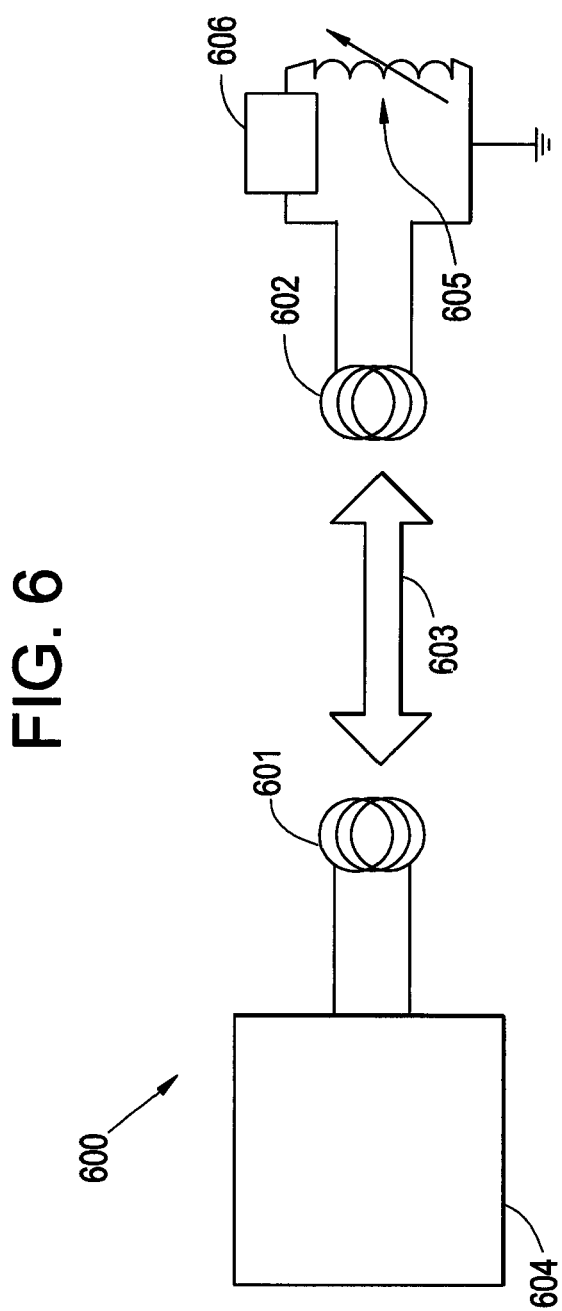

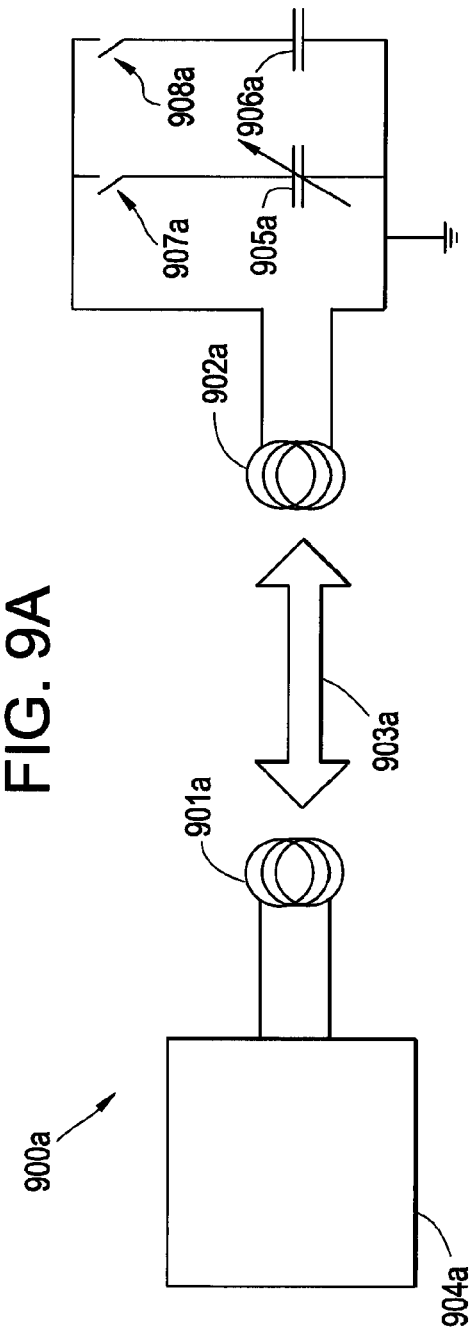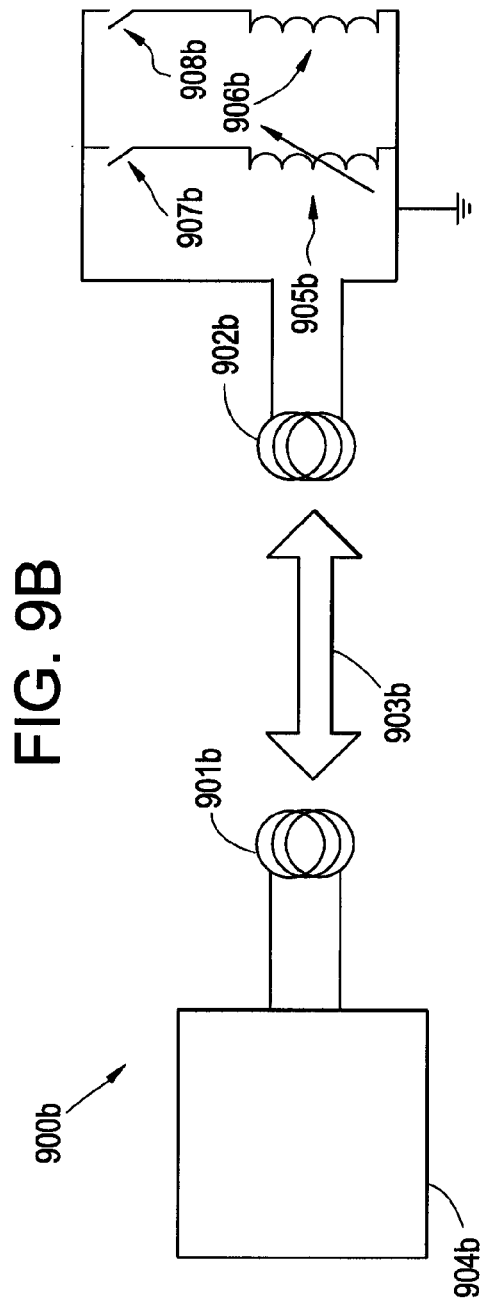

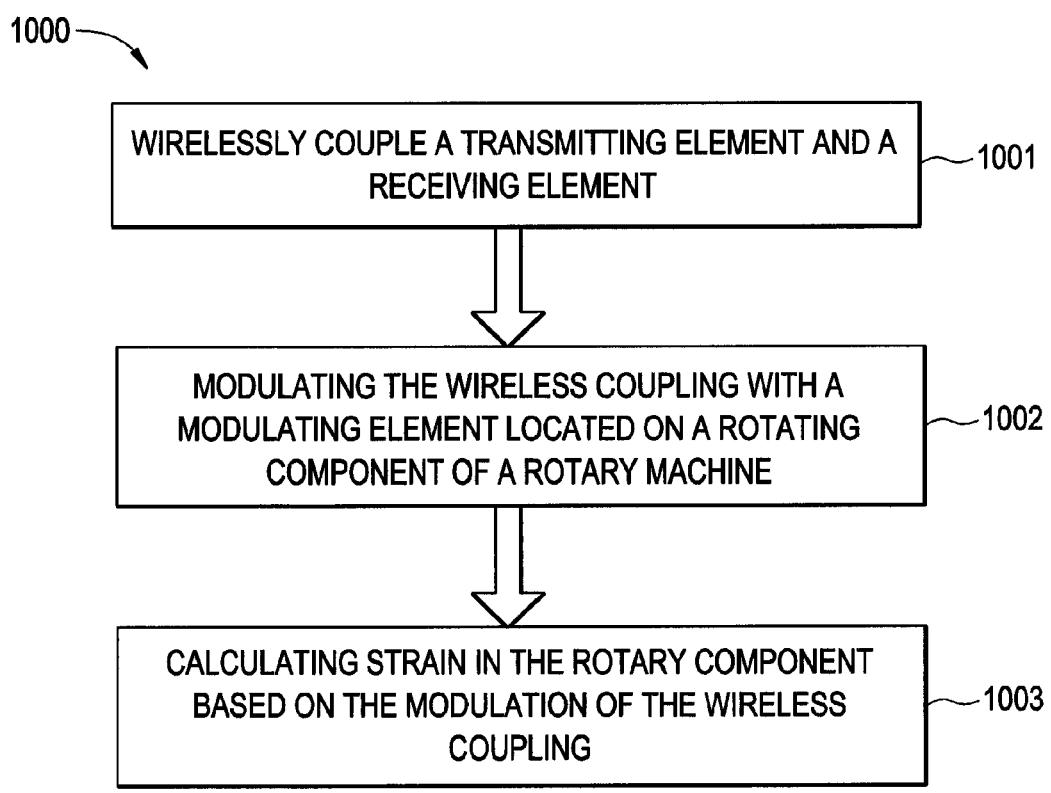

WIRELESS STRAIN SENSORS, DETECTION METHODS, AND SYSTEMS

BACKGROUND OF THE INVENTION

The present disclosure generally relates to measurement of strain in rotating machinery.

Rotary machinery, for example, blades in an aircraft engine, may experience strain during operation, which may damage the machinery. Accurate measurement of strain is necessary to take appropriate measures to correct or prevent any damage that may occur in the rotary machinery. One approach to measurement of strain in rotary machinery may use wired strain sensors, which require wiring between a rotating component and a stationary part of the rotary machinery. However, a wired approach may be complex, expensive, and unreliable, due in part to the high temperature of the machinery in operation, as the electronic characteristics of the wiring may limit the range of temperatures over which a wired strain sensor may operate accurately.

Due to the limitations of wired strain sensors, wired strain measurements of a rotary machine may only be taken during testing of the rotary machinery; during operation in the field, wires strain sensors may be impractical. However, monitoring strain over the entire lifespan of the rotary machinery is desirable to ensure reliable operation of the rotary machinery. Strain measurements taken in the field may be correlated with control parameters to optimize field operation of the rotary machinery. Change observed in strain measurements over time may be also used to assess the health of the blades of the rotary machinery, allowing for appropriate maintenance scheduling.

Accordingly, there remains a need in the art for a strain sensor that is accurate over a wide range of temperatures and conditions, and that may be used over the lifespan of rotary machinery.

BRIEF DESCRIPTION OF THE INVENTION

Disclosed herein are systems and methods for a wireless strain sensor. In one embodiment, a strain sensor comprises a transmitting element; a receiving element wirelessly coupled to the transmitting element; and a modulating element located on a rotating component, wherein the modulating element modulates the wireless coupling between the transmitting element and the receiving element, wherein the modulation of the wireless coupling is indicative of strain on the rotating component.

A method of detecting strain in a rotating component of a rotary machine comprises wirelessly coupling a transmitting element and a receiving element; modulating the coupling with a modulating element located on the rotating component; and calculating the strain in the rotating component based on the modulation of the coupling.

This disclosure may be understood more readily by reference to the following detailed description of the various features of the disclosure and the examples included therein.

BRIEF DESCRIPTION OF THE DRAWINGS

Referring now to the figures wherein the like elements are numbered alike:

FIG. 4 shows an example arrangement of a wireless strain sensor.

FIG. 6 shows an example arrangement of a wireless strain sensor comprising an inductive sensor.

FIG. 9 shows an example arrangement of a wireless strain sensor with auto-referencing.

FIG. 10 shows an example of a method of detecting strain in a rotating component of a rotary machine.

DETAILED DESCRIPTION OF THE INVENTION

Figure 1:
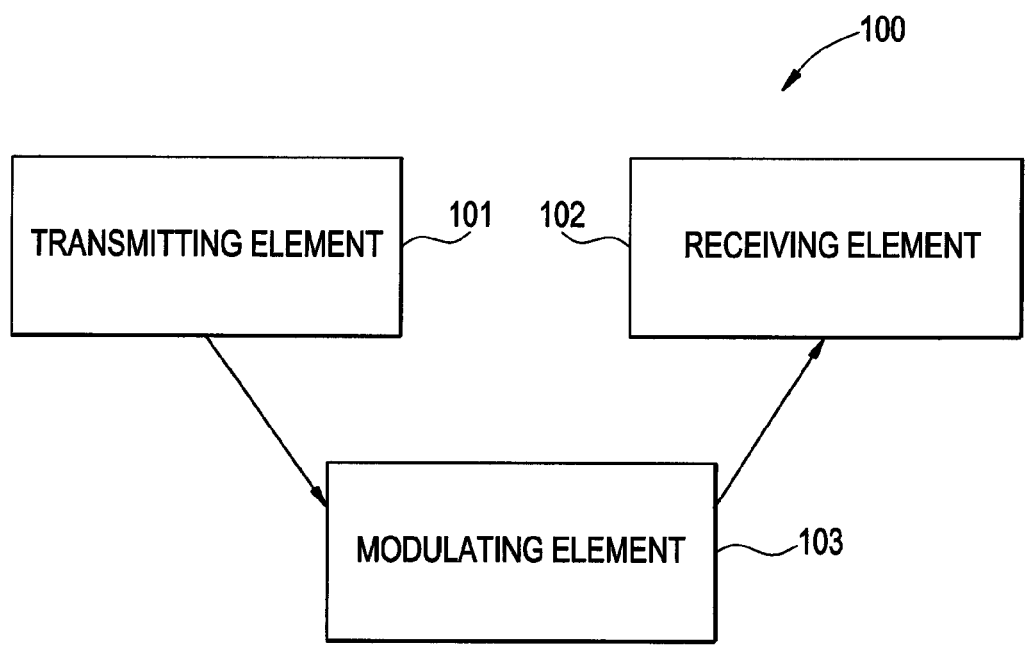
FIG. 1 shows an example arrangement of a wireless strain sensing system.

FIG. 1 shows an example arrangement of a wireless strain sensing system. Transmitting element 101 is in wireless communication with receiving element 102. The connection between transmitting element 101 and receiving element 102 is modulated by modulating element 103. Modulating element 103 may move with respect to transmitting element 101 and receiving element 102 due to strain in the system. This movement of modulating element 103 modulates the wireless coupling between transmitting element 101 and receiving element 102, allowing the strain in the system to be determined at receiving element 102.

Figure 2:
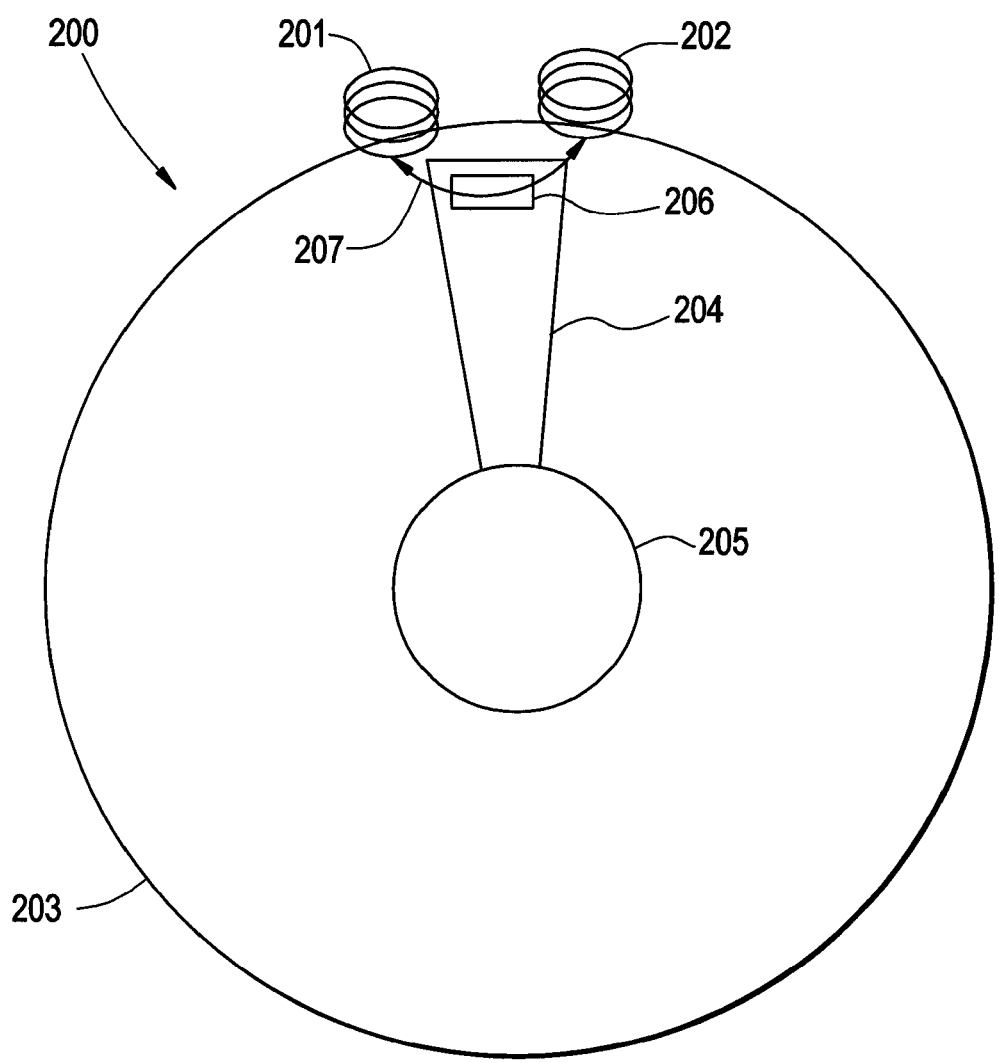
FIG. 2 shows an example arrangement of a wireless strain sensor.

FIG. 2 shows a cross-section of an engine 200 and illustrates an embodiment of a wireless strain sensor. It should be noted that although the illustrated examples are directed to a turbine engine application, the invention is more broadly applicable to measuring strain in rotating components of any rotary machine, non-limiting examples of which include wind turbines, and electric motors. Blade 204 rotates about axle 205 within stationary component, or shroud, 203. Although only one blade 204 is shown in FIG. 2, engine 200 may comprise a plurality of rotating blades. In the illustrated example, transmitting element 201 and receiving element 202 are mounted on stationary component 203. Non-limiting examples of a transmitting element 201 may comprise a coil, such as an inductive coil, an antenna structure, metal on an insulator, or a drawn conductor on a ceramic substrate. Non-limiting examples of a receiving element 203 may comprise a coil, such as an inductive coil, an antenna structure, metal on an insulator, or a drawn conductor on a ceramic substrate. Transmitting element 201 and receiving element 202 are connected by wireless coupling 207. In some embodiments, wireless coupling 207 may be a magnetic coupling such as a near field, a mutually inductive coupling, or a far field electric field coupling. For embodiments in which wireless coupling 207 comprises a magnetic coupling, the effective coupling constant (k) of a coupling 207 between transmitting element 201 and receiving element 202 is related to the rate of change of the magnetic field (B) of wireless coupling 207, i.e., k~d/dt(B). As blade 204 rotates, wireless coupling 207 is modulated by modulating element 206, which is disposed on the surface of blade 204. Strain from the rotation may cause deformation in blade 204 (for example, blade 204 may stretch), moving modulating element 206 relative to coupling 107, and causing further modulation of wireless coupling 207. Therefore, the modulation of wireless coupling 207 (d(B)/dt) is a function of the displacement of modulating element 206. In some embodiments, the modulating element 206 may comprise a material that changes permeability in response to strain or crystalline deformations, which cause realignment of atomic structure.

Because the strain experienced by blade 204 is a function of the displacement of modulating element 206, the strain may be determined as a function of the coupling constant (k) between transmitting element 201 and receiving element 202. The strain on blade 204 is thereby wirelessly determined using a passive approach with no active electronics or p/n junctions, which may only operate accurately over a limited range of temperatures. At higher temperatures, leakage through p/n junctions may increase to a point where accuracy and life of the electronics are adversely affected. Embodiments of modulating element 206 may comprise a high permeability material selected to modulate an inductive circuit, or a relatively high permittivity material selected to modulate the capacitance of a capacitor circuit. In some embodiments modulating element 206 may have a relatively high permittivity with respect to air, allowing for use of a relatively small capacitor. Use of a relatively small capacitor allows the strain to be measured more precisely. The modulating element 206 may be selected to have a high temperature Curie point. Embodiments of a wireless strain sensor may produce accurate results at temperatures up to 1200° F.

Figure 3A:
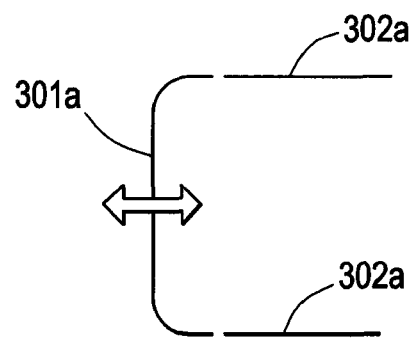
FIGS. 3a and 3b schematically depict examples of modulating element patterns.
Figure 3B:
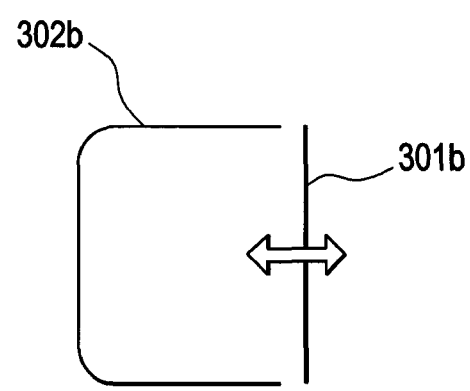

FIGS. 3a and 3b illustrate exemplary embodiments of modulating element patterns. Referring to FIG. 3a, modulating element 310a may move in the direction indicated by the arrows in relation to coupling 302a, which connects transmitting element 301 and receiving element 302. Referring to FIG. 3b, modulating element 301b may move in the direction indicated by the arrows in relation to coupling 302b, which connects transmitting element 301 and receiving element 302. The amount of displacement of modulating element 301a or 301b due to strain on blade 304 may be small; however, a very small displacement of modulating element 301a or 301b may result in a relatively large modulation in coupling 302a or 302b. Coupling 302a or 302b may act as an amplifier, allowing strain-based displacement of modulating element 301a or 301b to be accurately detected.

FIG. 4 shows another example arrangement of a wireless strain sensor 400. Receiving element 401 and reader electronics 404 are disposed around the shroud or approximately at the perimeter area of the blades (not shown). Although the illustrated example is directed to an engine, strain sensor 400 is applicable to any type of rotary machine, including turbines, motors, or any other non-contact strain sensing application. Transmitting element 402 and sensor components 405 are disposed on one of the rotating blades. The impedance of the passive circuit formed by transmitting element 402 and sensor components 405 is modulated by the strain on the blade in this particular, non-limiting example, as is discussed in further detail below regarding FIGS. 5a, 5b, and 5c. The modulation of the impedance at transmitting element 402 in turn modulates wireless coupling 403 between receiving element 401 and transmitting element 402, resulting in a change in impedance at receiving element 401. The change in impedance at receiving element 402 may be used to calculate the strain on the blade by reader electronics 404. The strain on the blade may therefore be calculated wirelessly using a passive approach with no active electronics or p/n junctions, which may only operate accurately over a limited range of temperatures. Sensor components 405 may be selected to have a high temperature Curie point, and hence embodiments of a wireless strain sensor may produce accurate results at temperatures up to 1200° F.

Figure 5A:
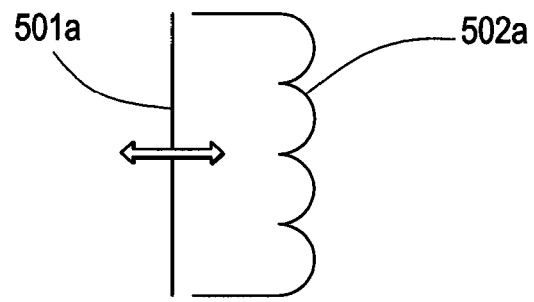
FIGS. 5a, 5b, and 5c show example arrangements of modulating element patterns.
Figure 5B:
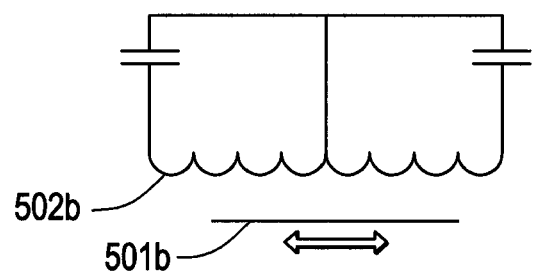
Figure 5C:
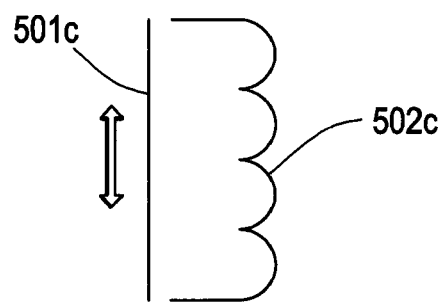

FIGS. 5a, 5b, and 5c show illustrative embodiments of sensor components 405. Referring to FIG. 5a, sensor components 505 may comprise a modulating element 501a and an inductor 502a. Strain on the blade moves the relative position of modulating element 501a with regards to inductor 502a, as shown by the arrows. Even a small movement of modulating element 501a in relation to inductor 502a may induce a relatively large change in the impedance of the circuit formed by sensor components 405 and transmitting element 402, which in turn modulates the resonance frequency and impedance of wireless coupling 403 between receiving element 401 and transmitting element 402, allowing the strain to be wirelessly read out as discussed above with regards to FIG. 4. FIGS. 5b and 5c operate in a manner similar to FIG. 5a, with modulating element 501b and 501c moving relative to inductors 502b and 502c, respectively. Modulating elements 501a, 501b, and 501c may comprise a high permeability material in some embodiments.

Figure 7:
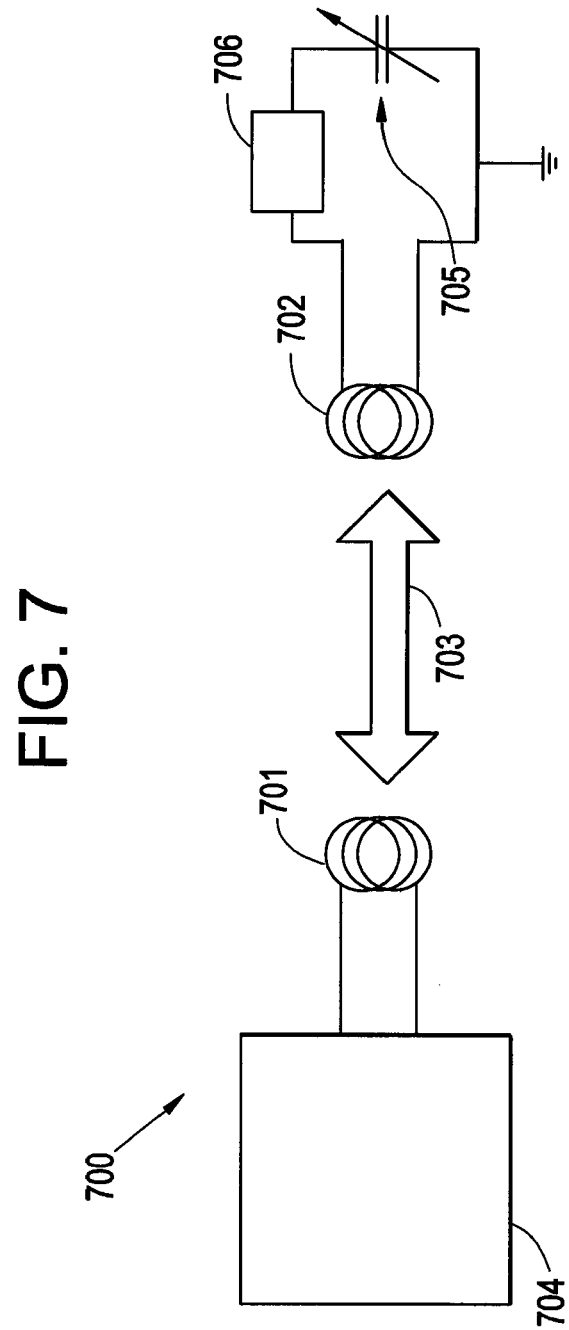
FIG. 7 shows an example arrangement of a wireless strain sensor comprising a capacitive sensor.

FIG. 6 shows an alternate embodiment of a wireless strain sensor 600 comprising an impedance transformer 606. Wireless strain sensor 600 comprises receiving element 601, transmitting element 602, wireless coupling 603, and reader electronics 604. The impedance transformer 606 shifts the frequency range of operation of the circuit comprised of transmitting element 602 and sensor components 605 to a more suitable range, and amplifies the resulting frequency shift detected at receiver 601. FIG. 7 illustrates a capacitive embodiment of a wireless strain sensor 700. Wireless strain sensor 700 comprises receiving element 701, transmitting element 702, wireless coupling 703, reader electronics 704, and impedance transformer 706. Sensor components 705 comprise a capacitor in place of the inductor of sensor components 405. In the embodiment shown in FIG. 7, the sensor components 705 may comprise a capacitor and a high permittivity material.

Figure 8:
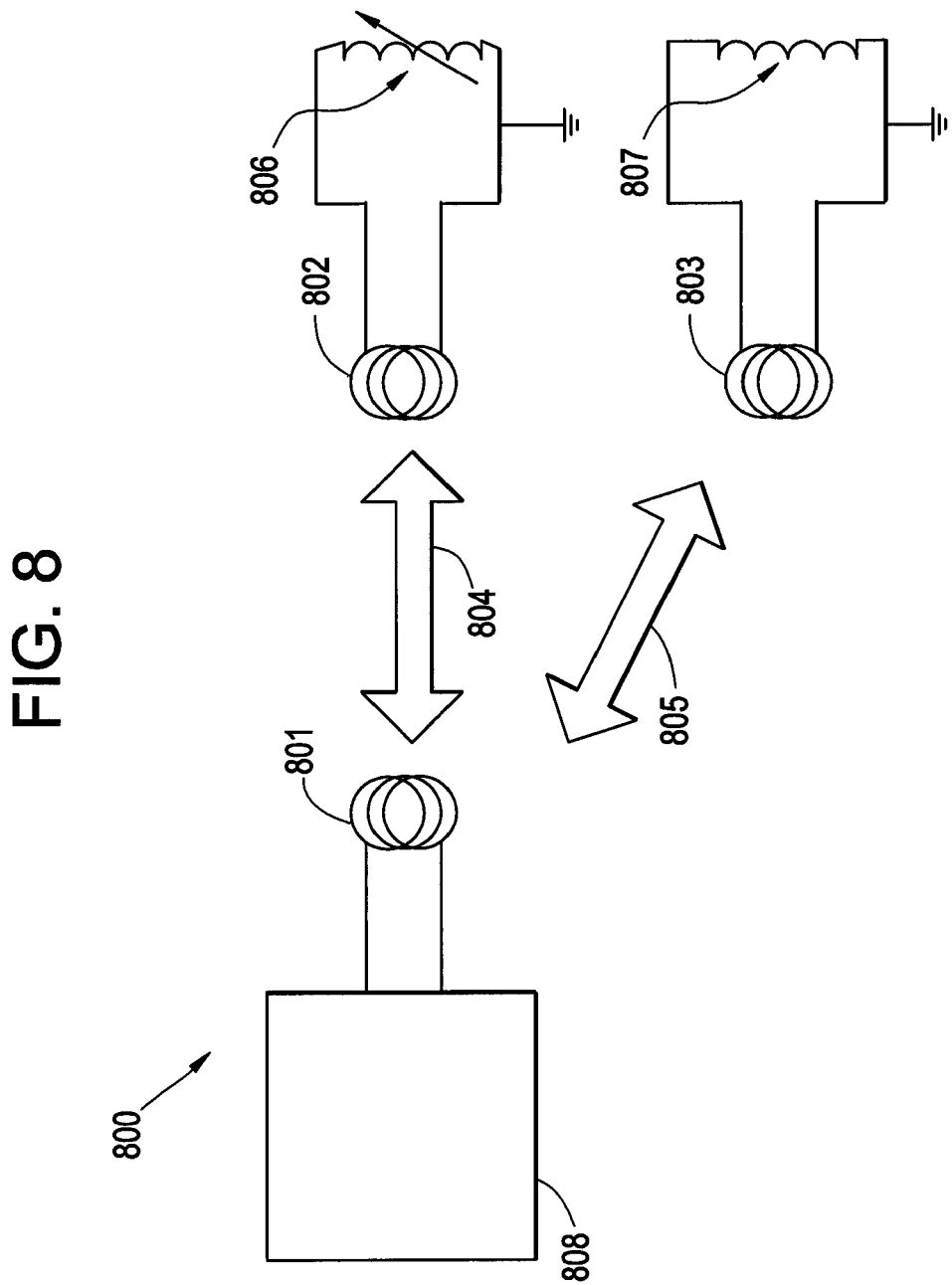
FIG. 8 shows an example arrangement of a wireless strain sensor with auto-referencing.

FIG. 8 shows an embodiment of a wireless strain sensor 800 including auto-referencing. Receiving element 801 and reader electronics 808 are disposed around the stationary component or approximately at the perimeter area of the rotating components, or, for the example of an engine, the blades (not shown). In the illustrated arrangement, transmitting element 802 and sensor components 806 are mounted on one of the blades, as are transmitting element 802 and reference components 807. Sensor components 806 comprise an inductor and a modulating element, whereas reference components 807 comprise an inductor. The strain on the blade moves the modulating element in relation to the inductor in sensor components 806 (as discussed above in relation to FIGS. 5a, 5b, and 5c) modulating wireless coupling 804. Wireless coupling 805 is not modulated by the strain on the blade, and may be used as a reference to determine any effects on coupling 804 due to noise, temperature variation, or transmit power variations. The strain on the blade is then calculated based on couplings 804 and 805 at reader electronics 808. As wireless coupling 805 is not affected by strain, but may be modulated by variations in temperature or coupling strength, confounding effects of temperature and coupling strength may be removed from the strain data, and a corrected strain measurement is obtained, giving increased accuracy, sensitivity and specificity. Additionally, information about other variables in the rotary machinery, such as the operating temperature, may be assessed independently of strain; this knowledge may be used to determine the overall health of the rotary machinery.

FIGS. 9a and 9b show further embodiments of a strain sensor comprising auto-referencing. FIG. 9a shows a capacitive approach. Receiving element 901a and reader electronics 904a are disposed around the stationary component or approximately at the perimeter area of the rotating components, or, for the example of an engine, the blades (not shown). Transmitting element 902a, sensor components 905a, reference components 906a, and switches 907a and 908a are disposed on the rotating blade. Sensor components 905a comprise a capacitor and a high permittivity material, and reference components 906a comprise a capacitor. Switches 907a and 908a may be used to complete the circuit with transmitting component 902a using either sensor components 905a or reference components 906a, allowing reader electronics 904a to obtain readings of wireless coupling 903a either with or without the presence of the modulating element. Reader electronics 904a may therefore cancel out any effects on wireless coupling 903a due to noise. FIG. 9b shows an inductive approach; in FIG. 9b, sensor components 905b comprise an inductor and a high permeability material, and reference components 906b comprises an inductor.

FIG. 10 shows an embodiment of a method 1000 of detecting strain in a component of a rotary machine. In block 1001, a first coil and a second coil are wirelessly coupled. In block 1002, the wireless coupling is modulated by a modulating element located on the rotating component. In block 1003, the strain in the rotating component is calculated based on the modulation of the wireless coupling.

In some embodiments, the modulating element may comprise a high permeability material in an inductive embodiment of a wireless strain sensor, or a high permittivity material in a capacitive embodiment. Some examples of high permeability materials that may be used in embodiments of a wireless strain sensor include, but are not limited to, iron alloys, nickel alloys, an iron-nickel alloy, chrome, or other ferromagnetic alloys. Examples of high permittivity materials may include, but are not limited to, oxides, ceramics, alumina, barium silicate, as well as conventional capacitor ceramic material such as NPO and X7R, or $LiNbO_3$. An appropriate material may be selected based on the operating temperature of the rotary machine that is being measured for strain, as different materials may have different magnetic responses as different temperatures. Embodiments of a strain sensor may be used to detect strain in any machine that comprises rotating components, including but not limited to a compressor or a turbine in an aircraft engine, power generation turbines such as gas or steam turbines, or a generator.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

Also, the terms "first", "second", "bottom", "top", and the like do not denote any order, quantity, or importance, but rather are used to distinguish one element from another; and the terms "the", "a", and "an" do not denote a limitation of quantity, but rather denote the presence of at least one of the referenced items. The modifier "about" used in connection with a quantity is inclusive of the stated value and has the meaning dictated by the context or includes at least the degree of error associated with measurement of the particular quantity. Furthermore, all ranges reciting the same quantity or physical property are inclusive of the recited endpoints and independently combinable.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A method of detecting strain in a rotating component of a rotary machine, comprising:
   wirelessly coupling a transmitting element and a receiving element;
   modulating one of an inductive element or a capacitive element and at least one characteristic of the wireless coupling with a modulating element located on the rotating component, wherein the modulation of the one of an inductive element or a capacitive element and the wireless coupling is indicative of strain on the rotating component; and
   calculating the strain on the rotating component based on the modulation of the one of an inductive element or a capacitive element and the wireless coupling.

2. The method of claim 1, further comprising disposing the transmitting element and the receiving element on a stationary component at a perimeter of the rotating component.

3. The method of claim 1, further comprising disposing the receiving element on a stationary component at a perimeter of the rotating component, and placing the transmitting element on the rotating component.

4. The method of claim 3, further comprising providing a strain sensor circuit on the rotating component, the strain sensor circuit comprised of the transmitting element, the modulating element, and an inductor, wherein a distance between the modulating element and the inductor varies with the strain on the rotating component.

5. The method of claim 4, further comprising providing a reference circuit on the rotating component, the reference circuit comprising a second inductor, and comparing an output of the reference circuit to an output of the strain sensor circuit to determine an effect of noise on the wireless coupling.

6. The method of claim 3, further comprising providing a strain sensor circuit on the rotating component, the strain sensor circuit comprised of the transmitting element, the modulating element, and a capacitor, wherein a distance between the modulating element and the capacitor varies with the strain on the rotating component.

7. The method of claim 6, further comprising providing a reference circuit on the rotating component, the reference circuit comprising a second capacitor, and comparing an output of the reference circuit to an output of the strain sensor circuit to determine an effect of noise on the wireless coupling.

8. The method of claim 1, wherein the wireless coupling between the transmitting element and the receiving element is a magnetic coupling.

9. The method of claim 1, wherein the rotary machine comprises a turbine engine, and wherein the rotating component comprises a blade.

10. The method of claim 1, wherein step of the modulating at least one characteristic of the wireless coupling includes modulating at least one of a reflection coefficient, an absorption coefficient, an s-matrix coefficient, a resonance frequency or a quality factor.

11. A strain sensing system, comprising:
    a transmitting element;

a receiving element wirelessly coupled to the transmitting element;

a modulating element selected to modulate one of an inductive element or a capacitive element and located on a rotating component of a rotary machine, wherein the modulating element modulates the one of an inductive element or a capacitive element and the wireless coupling between the transmitting element and the receiving element, wherein the modulation of the one of an inductive element or a capacitive element and the wireless coupling is indicative of strain on the rotating component; and a processor configured to calculate the strain in the rotating component based on the modulation of the wireless coupling.

12. A strain sensor comprising:

a transmitting element;

a receiving element wirelessly coupled to the transmitting element and defining a wireless coupling channel therebetween; and a modulating element disposed between the transmitting element and the receiving element, wherein the modulating element modulates the wireless coupling channel subsequent to transmission by the transmitting element and prior to receipt by the receiving element, wherein the modulation is indicative of strain on the rotating component.

13. The strain sensor of claim 12, wherein the transmitting element and the receiving element are located on a stationary component at a perimeter of the rotating component.

14. The strain sensor of claim 12, wherein the modulating element is located on the rotating component.

15. The strain sensor of claim 12, wherein the wireless coupling between the transmitting element and the receiving element is a magnetic coupling.

* * * * *